United States Patent
Mikami et al.

(10) Patent No.: US 8,503,281 B2
(45) Date of Patent: Aug. 6, 2013

(54) OPTICAL RECORDING DISC AND METHOD FOR RECORDING OR READING DATA ON THE OPTICAL RECORDING DISC

(75) Inventors: Tatsuo Mikami, Kanagawa (JP); Toshiyuki Kitahara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/581,724

(22) PCT Filed: Feb. 2, 2011

(86) PCT No.: PCT/JP2011/000586
§ 371 (c)(1), (2), (4) Date: Aug. 29, 2012

(87) PCT Pub. No.: WO2011/111294
PCT Pub. Date: Sep. 15, 2011

(65) Prior Publication Data
US 2012/0320726 A1    Dec. 20, 2012

(30) Foreign Application Priority Data

Mar. 10, 2010  (JP) ................................. 2010-053283

(51) Int. Cl.
*G11B 3/70* (2006.01)
(52) U.S. Cl.
USPC ...................................................... 369/286
(58) Field of Classification Search
USPC .................... 369/275.1–275.4, 286
See application file for complete search history.

(56) References Cited

U.S. PATENT DOCUMENTS

| 6,232,045 B1 * | 5/2001 | Jacobowitz et al. ........... 430/321 |
| 6,269,064 B1 * | 7/2001 | DeCusatis et al. .......... 369/59.25 |
| 6,353,592 B1 * | 3/2002 | Kashiwagi et al. ............. 369/283 |
| 7,313,080 B2 * | 12/2007 | Shiono et al. .............. 369/275.1 |
| 7,626,910 B2 * | 12/2009 | Hirao et al. .................... 369/103 |
| 2004/0228260 A1 | 11/2004 | Murata et al. |
| 2005/0082162 A1 * | 4/2005 | Uno et al. ................ 204/192.26 |
| 2006/0072438 A1 * | 4/2006 | Nishino et al. ............. 369/275.1 |
| 2008/0013441 A1 * | 1/2008 | Oouchida .................. 369/275.4 |

(Continued)

FOREIGN PATENT DOCUMENTS

| JP | 2003-242677 A |   | 8/2003 |
| JP | 2003242677 A | * | 8/2003 |

(Continued)

OTHER PUBLICATIONS

Nobuaki Onagi et al., "High Density Recording on an Air Stabilized Flexible Optical Disk", Ricoh Technical Report, Dec. 2004, pp. 37-44, No. 30.

(Continued)

*Primary Examiner* — Wayne Young
*Assistant Examiner* — Brenda Bernardi
(74) *Attorney, Agent, or Firm* — Sughrue Mion, PLLC

(57) ABSTRACT

An optical recording disc comprises: at least ten optical recording layers; a plurality of intermediate layers each interposed between adjacent optical recording layers; a base film configured to support the optical recording layers and the intermediate layers; a cover layer disposed opposite to the base film with the optical recording layers and the intermediate layers interposed therebetween. The optical recording disc is in the shape of a disc as a whole. The total thickness of the optical recording disc is not more than 300 micrometers, and the optical recording disc provides flexibility.

17 Claims, 5 Drawing Sheets

U.S. PATENT DOCUMENTS

| | | | |
|---|---|---|---|
| 2008/0130474 A1* | 6/2008 | Schmidhalter et al. | 369/275.1 |
| 2009/0141609 A1 | 6/2009 | Mishima et al. | |
| 2009/0257341 A1 | 10/2009 | Hirotsune et al. | |
| 2009/0309906 A1 | 12/2009 | Tsukuda et al. | |

FOREIGN PATENT DOCUMENTS

| | | | |
|---|---|---|---|
| JP | 2004-178756 A | | 6/2004 |
| JP | 2004178756 A | * | 6/2004 |
| JP | 2004-355786 A | | 12/2004 |
| JP | 2005-11412 A | | 1/2005 |
| JP | 2008-27517 A | | 2/2008 |
| JP | 2008027517 A | * | 2/2008 |
| JP | 4140823 B2 | | 8/2008 |
| JP | 2008-310917 A | | 12/2008 |
| JP | 2009-116985 A | | 5/2009 |
| JP | 2009-134784 A | | 6/2009 |
| JP | 2009-252328 A | | 10/2009 |
| JP | 2009-252340 A | | 10/2009 |
| WO | 2008/007564 A1 | | 1/2008 |

OTHER PUBLICATIONS

Ayumi Mitsumori et al., "Miltilayer 500 Gbyte Optical Disk", Japanese Journal of Applied Physics, Mar. 23, 2009, 7 pgs, vol. 48, No. 3 (pp. 03A055-1 to -7).

Koji Mishima et al., "150 GB, 6-layer write once disc for Blu-ray Disc System", Proc. of SPIE, 2006, 11 pgs., vol. 6282, 628201-1 to -11.

Isao Ichimura et al., "High-density multilayer optical disc storage", Proc. of SPIE, 2006, vol. 6282, 628212-1 to -12.

International Search Report for PCT/JP2011/000586 dated Mar. 15, 2011 (3pages).

Written Opinion for PCT/JP2011/000586 dated dated Mar. 15, 2011.

* cited by examiner

Fig. 6

| | Thickness of Layers [μm] | | | | Number of Recording Layers | Total Thickness [μm] | Position of Groove | Spot size of Laser beam at the surface of Cover layer when the First Optical recording layer counting from the Cover layer is read using Laser beam irradiated from Cover layer side [μm] | Spot size of Laser beam at the surface of Base film when the First Optical recording layer counting from Cover layer is read using Laser beam irradiated from Base film side [μm] |
|---|---|---|---|---|---|---|---|---|---|
| | Base Film | Recording Layer | Intermediate Layer | Cover Layer | | | | | |
| Example 1 | 10 | 1 | 10 | 10 | 20 | 230 | Inner side of Cover Layer | 13.8 | 165.1 |
| Example 2 | 10 | 1 | 5 | 10 | 40 | 255 | Inner side of Cover Layer | 13.8 | 178.8 |
| Example 3 | 50 | 1 | 9 | 50 | 20 | 291 | Inner side of Cover Layer | 68.8 | 206.3 |
| Example 4 | 40 | 0.5 | 5 | 40 | 40 | 295 | Inner side of Cover Layer | 55.0 | 206.3 |
| Example 5 | 30 | 0.05 | 6 | 30 | 40 | 296 | Inner side of Cover Layer | 41.3 | 207.7 |
| Example 6 | 10 | 1 | 10 | 10 | 20 | 230 | Intermediate Layer between 10th and 11th Recording Layers | 13.8 | 165.1 |
| Comp. Ex. 1 | 50 | 1 | 10 | 50 | 40 | 530 | Inner side of Cover Layer | 68.8 | 371.4 |
| Comp. Ex. 2 | 100 | 1 | 10 | 100 | 20 | 410 | Inner side of Cover Layer | 137.5 | 288.9 |

OPTICAL RECORDING DISC AND METHOD FOR RECORDING OR READING DATA ON THE OPTICAL RECORDING DISC

TECHNICAL FIELD

The present invention relates to an optical recording disc and a method for recording or reading data on the optical recording disc.

BACKGROUND ART

In recent years, study has been made on optical recording media for recording or reading information using a laser beam, etc., in which storage capacity per disc can be increased by laminating recording layers into a multi-layered structure. See Patent Literatures 1-3 and Non-patent Literatures 1-3.

Meanwhile, study has also been made to realize a high-capacity cartridge, in which a large number of extremely-thin flexible discs (see, for example, Patent Literatures 4-6 and Non-patent Literature 4) are stored in a cartridge case and taken out and used one by one using a changer.

CITATION LIST

Patent Literature

Patent Literature 1: Japanese Laid-open Patent Application, Publication No. 2009-134784
Patent Literature 2: Japanese Laid-open Patent Application, Publication No. 2009-252340
Patent Literature 3: International Publication No. 2008/007564
Patent Literature 4: Japanese Patent No. 4140823
Patent Literature 5: Japanese Laid-open Patent Application, Publication No. 2005-011412
Patent Literature 6: Japanese Laid-open Patent Application, Publication No. 2009-116985

Non-patent Literature

Non-patent Literature 1: H. Mitsumori et al., Jpn. J. Appl. Phys. Vol. 48, No. 3 (2009) 03A055
Non-patent Literature 2: Mishima et al. "150 GB, 6-layer write once disc for Blu-ray Disc system", Proc. of SPIE 6282 (2006) 628201
Non-patent Literature 3: Isao Ichimura et al. Proc. SPIE, Vol. 6282, 628212 (2007)
Non-patent Literature 4: Onagi et al. Ricoh Technical Report No. 30, p37

SUMMARY OF INVENTION

Technical Problem

According to the conventional optical recording medium having multi-layered recording layers, a laminated structure of the recording layers and the intermediate layers has a considerable thickness, with the result that the thickness of the whole medium becomes larger and hence the medium does not provide flexibility. Therefore, if the medium is rotated at high speeds (e.g., 10000 rpm or greater), the medium may be disadvantageously damaged due to resonance of the medium. Accordingly, despite an effort to increase a data transfer rate, the conventional optical recording medium has a limitation on the maximum rotation speed of the medium.

In view of the above, it would be desirable to provide a high-capacity optical recording disc which can be rotated at high speeds and a method for recording or reading data on the optical recording disc.

Solution to Problem

According to the present invention, there is provided an optical recording disc comprising: at least ten optical recording layers; a plurality of intermediate layers each interposed between adjacent optical recording layers; a base film configured to support the optical recording layers and the intermediate layers; a cover layer disposed opposite to the base film with the optical recording layers and the intermediate layers interposed therebetween, wherein the optical recording disc is in the shape of a disc as a whole, and wherein the total thickness of the optical recording disc is not more than 300 micrometers, and the optical recording disc provides flexibility.

With this configuration of the optical recording disc having the total thickness not more than 300 micrometers and providing flexibility, resonance which is likely to occur if the thickness of the disc is more than 300 micrometers hardly occurs and thus the disc can be rotated at high speeds. This makes it possible to achieve a high data transfer rate. Further, since at least ten recording layers are laminated within the thickness of 300 micrometers, a high-capacity optical recording disc can be achieved.

In the above optical recording disc, the cover layer may have a thickness in the range of 10-50 micrometers.

In the above optical recording disc, a spiral-shaped groove used for tracking may be formed on an inner surface of at least one of the cover layer and the base film. Further, at least one of the intermediate layers may have a spiral-shaped groove used for tracking.

According to the present invention, there is also provided a method for recording or reading data on the aforementioned optical recording disc, comprising the steps of: setting the optical recording disc in a recording apparatus or a reading apparatus; and recording or reading data on the optical recording layers in such a manner that if a distance from an optical recording layer to an outer surface of the base film is smaller than a distance from the optical recording layer to an outer surface of the cover layer, the optical recording layer is irradiated with light incident onto the optical recording layer through the cover layer, whereas if the distance from the optical recording layer to the outer surface of the base film is greater than the distance from the optical recording layer to the outer surface of the cover layer, the optical recording layer is irradiated with light incident onto the optical recording layer through the base film.

Accordingly, recording or reading of data is performed from both sides of the optical recording disc in such a manner that the data is recorded on or read from a subject optical recording layer positioned at a far-side as viewed from the light-irradiation side from which light used for recording or reading is incident onto the subject optical recording layer. This can ensure a relatively large distance between the subject optical recording layer and the surface of the optical recording disc from which light is incident for recording or reading of the data. Accordingly, even if the surface of the optical recording disc has a scratch or dust is adhered to the surface of the optical recording disc, such a scratch or dust is less likely to affect on recording or reading performance because a focal point on the subject recording layer can be distanced away from the scratch or dust as compared with the case in which the subject recording layer is irradiated with light coming from the near side. A conventional technique is to use an optical recording medium having a larger thickness for ensuring such a distance so that a scratch or dust on a disc surface hardly affects on the recording or reading performance. On the contrary, according to the present invention, a scratch or dust is not optically prone to affect the recording or reading performance even if a thin flexible disc is used, because recording or reading of the data is appropriately performed with respect to a subject optical recording layer from one side of the optical recording disc where the distance from the subject optical recording layer is greater.

The optical recording disc according to the present invention can not only achieve high-capacity but also realize high data transfer rate. Further, according to the recording or reading method for the optical recording disc of the present invention, the optical recording disc is less likely to be affected by a scratch or dust on the disc surface.

BRIEF DESCRIPTION OF DRAWINGS

FIG. 6 shows combination variations of respective layers provided in the optical recording disc.

DESCRIPTION OF EMBODIMENTS

Figure 1:
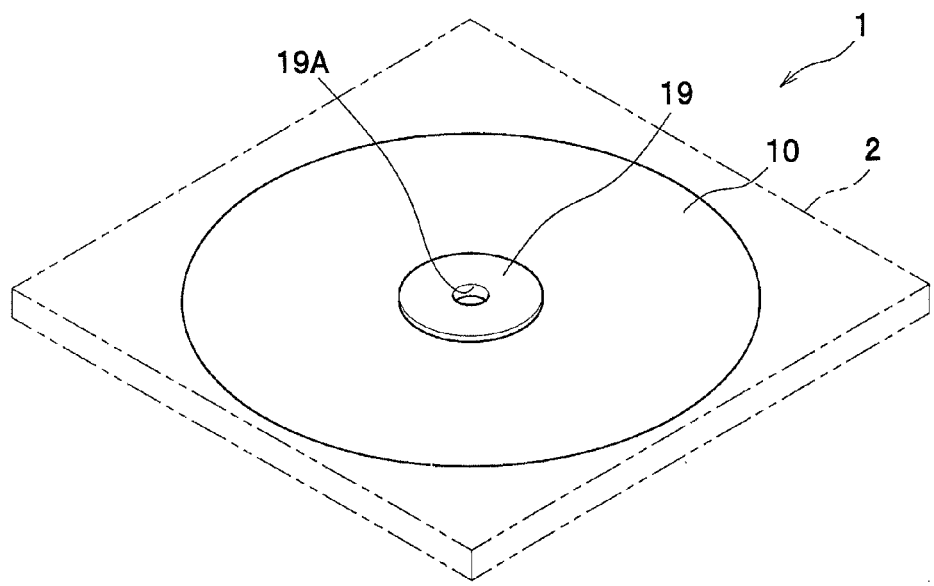
FIG. 1 is a perspective view of an optical recording disc according to one exemplary embodiment of the present invention.

One exemplary embodiment of the present invention will be described below. As seen in FIG. 1, an optical recording disc 1 according to one embodiment of the present invention is shaped like a circular disc as a whole, and a flexible disc portion 10 is supported by a core 19. In order to prevent damage due to bending, the optical recording disc 1 is preferably stored in a cartridge case 2 when it is handled.

Figure 2:
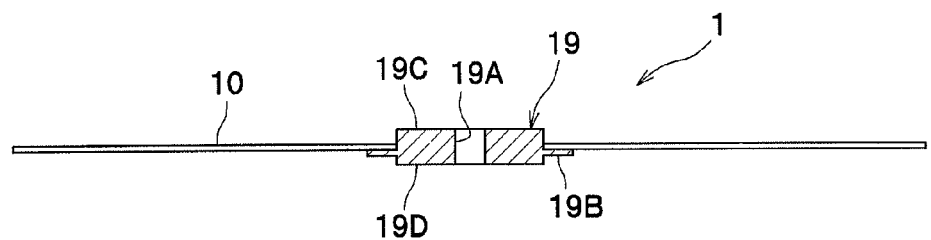
FIG. 2 is a sectional view of the optical recording disc.

The core 19 is a portion that is supported by a disc drive to be described later. As seen in FIGS. 1 and 2, the core 19 is shaped like a circular disc, and a through-hole 19A is formed in the center part of the core 19 for allowing the insertion of a spindle. A flange 19B is provided at an outer periphery of the core 19, and the disc portion 10 is fixed to the flange 19B by adhesion. The flange 19B is arranged at about middle of the thickness of the core 19 such that the disc portion 10 is supported by the flange 19B at the middle of the thickness of the core 19 (i.e., at the midpoint between (equally distant from) surfaces 19C, 19D which are to be supported by the spindle 32).

Figure 3:
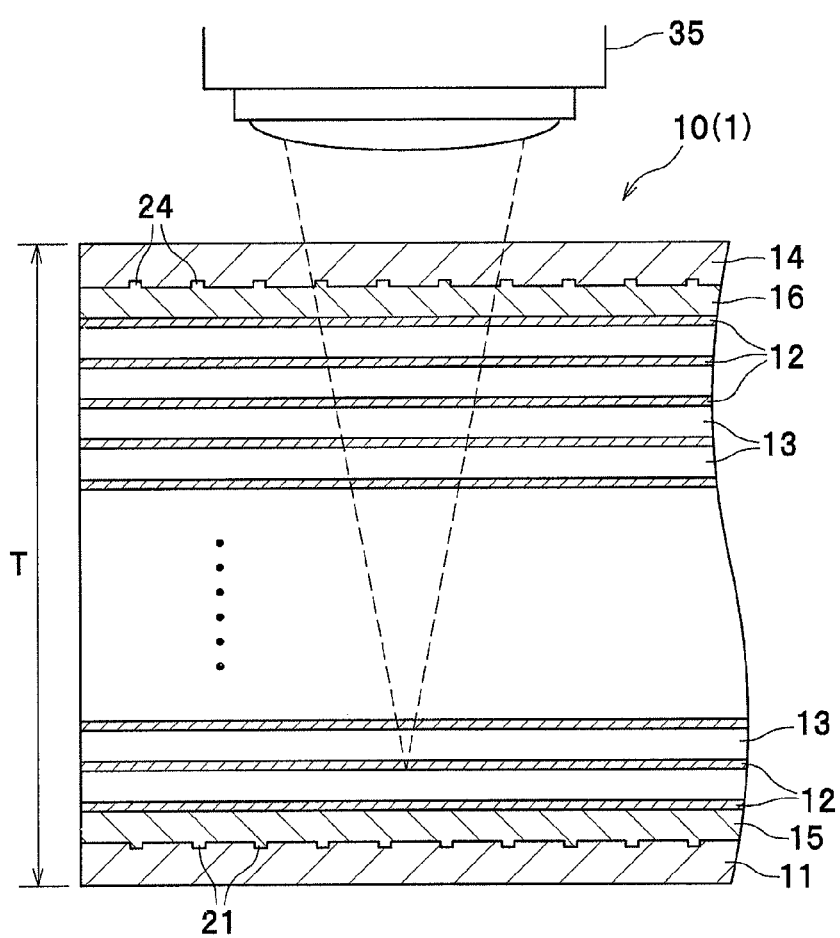
FIG. 3 is an explanatory view illustrating a layered structure of the optical recording disc.

As best seen in FIG. 3, the disc portion 10 includes a base film 11, a number of laminated optical recording layers 12 and intermediate layers 13 disposed on the base film 11, and a cover layer 14 disposed opposite to the base film 11. Further, spacer layers 15, 16 are positioned inward of the base film 11 and the cover layer 14, respectively. To be more specific, the multiple optical recording layers 12 are disposed between the two spacer layers 15, 16 with each of the intermediate layers 13 disposed between two adjacent optical recording layers 12. The total thickness T of the disc portion 10 is not more than 300 micrometers. The disc portion 10 provides flexibility to constitute a so-called flexible disc.

The base film 11 has a circular configuration and functions as a supporting member of the disc portion 10. To provide the disc portion 10 with a predetermined flexibility, it is preferable that the thickness of the base film 11 is in the range of 10-100 micrometers, and more preferably in the range of 10-50 micrometers. The base film 11 is made of a material such as polycarbonates, acrylic resins, polyesters, alicyclic hydrocarbon resins, epoxy, and acetals.

The optical recording layer 12 is a layer made of a recording material on which information is recordable using light (including ultraviolet light and infrared light) such as a laser beam. As with the conventional optical recording disc, the recording material for the optical recording layer 12 may be any known material as long as its optical property such as refractive index, light absorptance or fluorescent property changes when it is illuminated with light. As one example, the material for the optical recording layer 12 may comprise: an organic dye material such as cyanine dyes, phthalocyanine dyes, azo dyes; a phase-change material such as Ge—Sb—Te, and Ag—In—Sb—Te; and a metallic material such as Te, and Se.

The thickness of the optical recording layer 12 is determined in accordance with the sensitivity of the recording material such that a sufficient signal-to-noise ratio can be obtained. For example, the optical recording layer 12 has a thickness in the range of 0.01-2 micrometers. If the thickness of the optical recording layer 12 is equal to or greater than 0.01 micrometers, large signal strength can be observed to obtain a necessary signal-to-noise ratio. If the thickness of the optical recording layer 12 is equal to or less than 2 micrometers, ten or more optical recording layers 12 can be provided to realize a large storage capacity as well as to prevent crosstalk across layers (i.e., signals from adjacent optical recording layers 12 are mixed together) because a sufficient thickness can be provided for the intermediate layer 13.

To achieve a large storage capacity of the optical recording disc 1 as a whole, the optical recording disc 1 includes at least ten optical recording layers 12. As long as a sufficient thickness can be ensured for the intermediate layer 13, the more number of optical recording layers 12, such as 20 layers or 40 layers, is preferable.

The intermediate layer 13 is a layer for preventing crosstalk across adjacent optical recording layers 12, and has a thickness, for example, in the range of 3-20 micrometers. The intermediate layer 13 may be made of any known material as long as it satisfactorily allows transmission of light (i.e., light used for recording or reading data on the optical recording disc 1; hereinafter referred to as a recording/reading light). Preferred examples of material for use in the intermediate layer 13 may include: adhesive prepared by dissolving in a solvent a high-molecular compound such as acrylic compounds, methacrylic compounds, polyvinyl chloride compounds, polyvinyl alcohol compounds, polyvinyl acetate compounds, polystyrene compounds, or celluloses; a light curing adhesive mainly containing acrylate compounds, epoxy compounds, or oxetane compounds; hot melt adhesive mainly containing ethylene-vinyl acetate compounds, olefin compounds, or urethane compounds; and pressure sensitive adhesive comprising acrylic compounds, urethane compounds, silicone compounds or the like.

The cover layer 14 is provided for covering the surface opposite to the base film 11. The cover layer 14 may be formed in a manner similar to the base film 11, and the thickness and the material thereof may be the same as those of the base film 11. Although the base film 11 and the cover layer 14 are referred to by different names in this specification as a matter of convenience, they may be completely the same in configuration. Of course, the cover layer 14 and the base film 11 may be different in configuration. For example, the base film 11 may be thicker to increase the supporting capacity, whereas the cover layer 14 thinner than the base film 11 may be provided only for the purpose of protecting the surface opposite to the base film 11.

The base film 11 has an inner surface on which a spiral groove 21 used for tracking is provided. Similarly, the cover layer 14 has an inner surface on which a spiral groove 24 used for tracking is provided. The spiral groove 21 is formed, for example, by coating ultraviolet curable resin on the inner surface of the base film 11 and thereafter pressing a stamper having a ridge contoured to form a reverse pattern of the groove 21 against the ultraviolet curable resin, followed by exposure with ultraviolet light for curing. The spiral groove 24 on the cover layer 14 may be formed in a similar manner. Provided inward of the base film 11 and the cover layer 14 are spacer layers 15, 16 by which the inner surfaces having the grooves 21, 24 are spaced apart from an optical recording layer 12. For the purpose of detecting the groove 21 of the base film 11, the spacer layer 15 is made of a material having a refractive index different from that of the adjacent base film 11. For a similar reason, the spacer layer 16 is made of a material having a refractive index different from that of the adjacent cover layer 14.

The base film 11 and the cover layer 14 are configured such that at least one of them allows a recording/reading light to sufficiently pass therethrough, whereas the other one of them may not have a light transmissivity. However, for performing recording or reading of data from both sides of the optical recording disc 1 (i.e., disc portion 10) as described later, it is preferable that both of the base film 11 and the cover layer 14 can sufficiently transmit the recording/reading light. The same can be said of the spacers 15, 16, and if the adjacent base film 11 or the adjacent cover layer 14 has a light transmissivity, the corresponding spacer 15, 16 is configured to sufficiently transmit the recording/reading light. According to this embodiment, since the spacer layers 15, 16 are adjacent to the grooves 21, 24 for tracking, it is preferable that the spacer layers 15, 16 transmit light used for tracking servo to such an extent that the light can pass therethrough for detecting the position of the groove 21, 24. The thickness of the spacer layers 15, 16 is approximately in the range of 1-20 micrometers, and the spacer layers 15, 16 may be made of the same material as that used for the intermediate layer 13.

Figure 4:
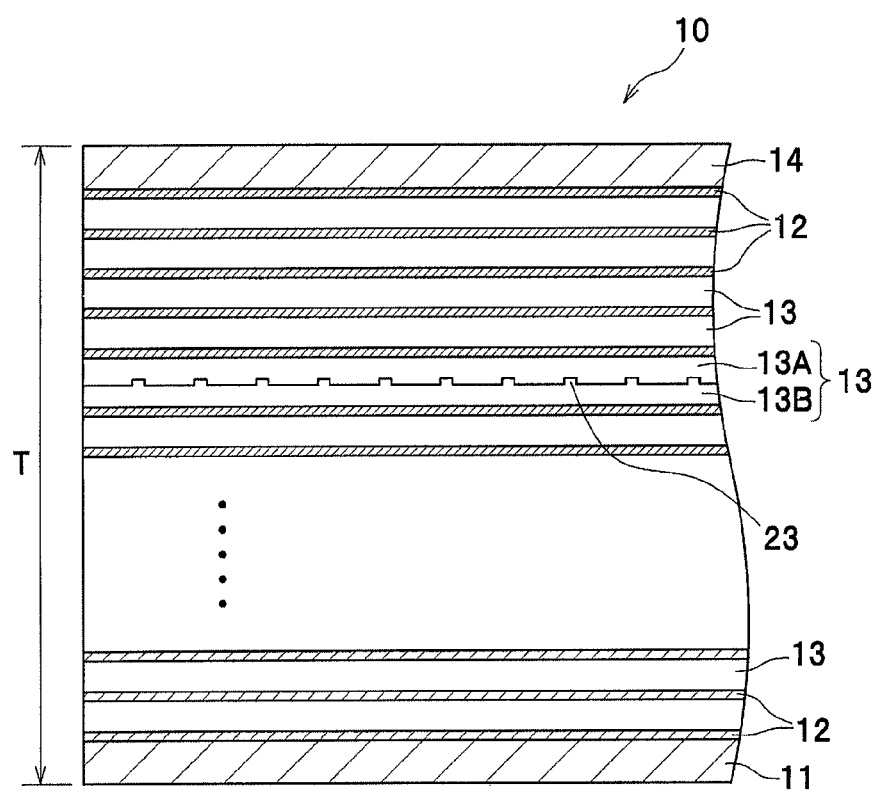
FIG. 4 is a sectional view showing a modified embodiment of the optical recording disc, in which a groove used for tracking is formed on an intermediate layer.

The groove for tracking may be formed on the intermediate layer 13, instead of being formed on the base film 11 or the cover layer 14. For example, as best seen in FIG. 4, one of the intermediate layers 13 may comprise a first intermediate layer 13A and a second intermediate layer 13B which have refractive indices different from each other, and a spiral groove 23 may be formed on the first intermediate layer 13A.

Next, description will be given of an example of an optical disc drive for recording and reading data on the optical recording disc 1.

Figure 5:
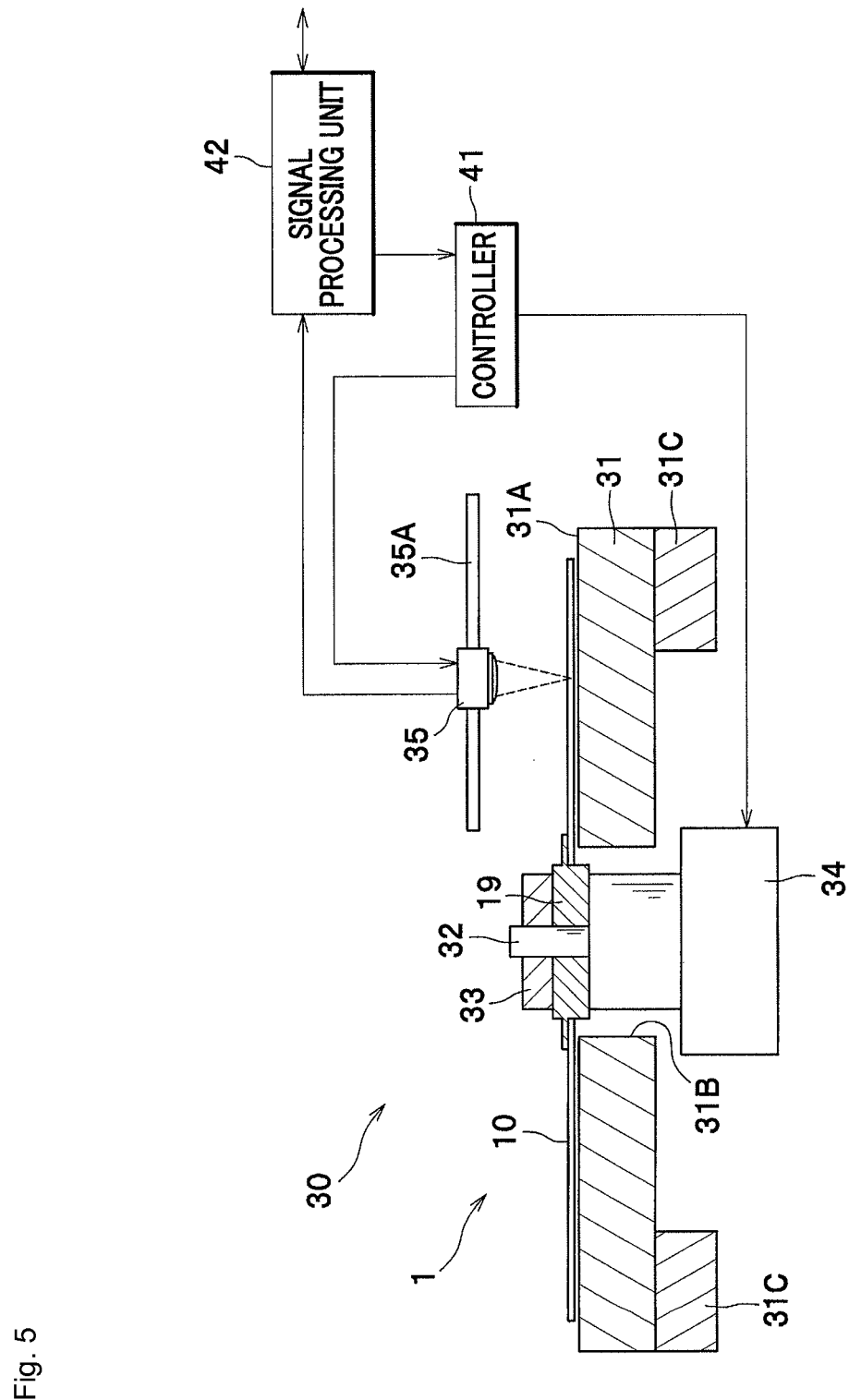
FIG. 5 is a schematic diagram of an optical disc drive.

As seen in FIG. 5, an optical disc drive 30 mainly includes a stabilizer 31, a spindle 32, a motor 34, an optical pickup 35, and a controller 41 for controlling operations of the motor 34 and the optical pickup 35.

The stabilizer 31 is a plate-like member having a plane surface portion 31A which is highly accurately flat, and a center hole 31B is formed in the stabilizer 31, through which the spindle 32 penetrates the stabilizer 31. The disc portion 10 of the optical recording disc 1 is placed on and faces the plane surface portion 31A of the stabilizer 31. For this reason, the plane surface portion 31A is greater in size than the disc portion 10. The stabilizer 31 is fixed to a sufficiently stable base (not shown) by a stabilizer holder 31C. The stabilizer 31 retains a very thin air layer against the rotating disc portion 10, so that the disc portion 10 can be stabilized during a high speed rotation of the optical recording disc 1 (e.g., approximately in the range of 15000-20000 rpm).

The spindle 32 is configured to rotate at high speeds while supporting the optical recording disc 1. The spindle 32 has a distal end having a shape corresponding to that of the through-hole 19A, so that when a cap 33 is engaged with the distal end of the spindle 32, the core 19 is securely held on the spindle 32.

The motor 34 is a driving source for rotating the spindle 32, and the rotor of the motor 34 is connected to the spindle 32. The rotation of the motor 34 is controlled by the controller 41.

The optical pickup 35 may be formed in a similar manner to a conventionally known pickup device which comprises a laser beam source, a lens, and a light receiving element. The optical pickup 35 moves along a guide 35A extending in a radial direction of the optical recording disc 1, so as to perform tracking. The tracking is made by adjusting the position of the optical pickup 35 such that the reflected light from the groove 21 or the groove 24 becomes a predetermined light intensity. Since the positions of the groove 21, 24 and each of the optical recording layers 12 are different in a depth direction (i.e., direction of the thickness) of the optical recording disc 1, it is preferable that the optical pickup 35 includes a set of a light source and a light receiving element used for recording or reading of the data, and a set of a light source and a light receiving element used for servo tracking.

A signal received at the optical pickup 35 during the reading of the data and a signal received at the optical pickup 35 for tracking are input to a signal processing unit 42.

The controller 41 is connected to the signal processing unit 42.

The signal processing unit 42 functions to output a recording signal to the controller 41; the recording signal is generated at the signal processing unit 42 during the recording of the data by encoding external input data into an output pattern of the optical pickup 35. The signal processing unit 42 also functions to decode a signal input from the optical pickup 35 and to output it to an external device. Further, the signal processing unit 42 calculates an amount of tracking error based on the received signal used for tracking, and for the purpose of effecting feedback control of the position of the optical pickup 35, the signal processing unit 42 outputs to the controller 41 a signal indicating a control amount required for positioning the optical pickup 35.

The controller 41 outputs a control signal to the motor 34 so as to cause the motor 34 to rotate in a predetermined rotation speed. The controller 41 also performs tracking control of the optical pickup 35 during recording and reading of the data such that the optical pickup 35 follows a predetermined recording position. Further, the controller 41 outputs the recording signal received from the signal processing unit 42 to the optical pickup 35 at the time of recording data, whereas the controller 41 causes the light source of the optical pickup 35 to emit light at a predetermined power output at the time of reading the data.

In addition to the above functions, the controller 41 has a function to focus the recording/reading light on a predetermined optical recording layer 12 among the plurality of optical recording layers 12. For example, the focus is first made on the optical recording layer 12 that is farthest from the light-irradiation side (i.e., the undermost optical recording layer 12 in FIG. 3), and thereafter the focus is gradually moved toward the near side (i.e., moved upward in FIG. 3) during which the number of the layers is counted so that the recording/reading light can be focused on a predetermined layer.

Preferably, recording or reading of data is performed from both sides of the optical recording disc 1 in such a manner that the data is recorded on or read from one optical recording layer 12 with light incident from the far side based on the distance from the subject optical recording layer 12 to the base film 11 and the distance from the subject optical recording layer 12 to the cover layer 14. To be more specific, if the subject optical recording layer 12 is closer to the outer surface of the base film 11, as best seen in FIG. 3, the recording or reading of the data is performed from the cover layer side, whereas if the subject optical recording layer 12 is closer to the outer surface of the cover layer 14, the optical recording disc 1 is reversed and supported by the spindle 32, and then the subject optical recording layer 12 is illuminated with light incident from the base film side for recording or reading of the data. Accordingly, since the subject optical recording layer 12 is irradiated with light coming from the far-side surface that is farther from the subject optical recording layer 12, a relatively large distance can be ensured between the subject optical recording layer 12 and the far-side surface of the optical recording disc 1 through which the light can pass. Therefore, even if the far-side surface of the optical recording disc 1 has a scratch or dust is adhered thereto, such a scratch or dust is less likely to affect on recording or reading of the data. According to the conventional non-flexible thick optical recording disc, light is irradiated through a thick substrate for performing recording or reading of data, and thus a scratch or dust on the substrate hardly affects on the recording or reading performance. On the contrary, the optical recording disc 1 according to this embodiment has a thickness as thin as 300 micrometers or less to provide flexibility, and more than ten optical recording layers 12 are provided in the disc portion 10, so that the base film 11 and the cover layer 14 are considerably thinner as compared with the conventional non-flexible optical recording disc. For this reason, as described above, the subject optical recording layer 12 is irradiated with light incident from the far-side surface in accordance with the position of the subject optical recording layer 12. This can avoid the adverse effect of a scratch or dust on the surface of the disc portion 10. The optical recording layer 12 positioned in the center between the outer surface of the base film 11 and the outer surface of the cover layer 14 may be illuminated with the recording/reading light from either side of the optical recording disc 1 (i.e., from the base film side or the cover layer side) to perform recording or reading of the data.

The user operating the optical disc drive 30 may input into the optical disc drive 30 where necessary instructions as to the position of the subject optical recording layer 12 on which recording or reading of the data is performed. Alternatively, the recording/reading light may be focused by the controller 41 in such a manner that the focus is only made on the optical recording layers 12 that are located below the middle of the thickness of the disc portion 10 (i.e., far-side optical recording layers 12). Further, an external device connected to the optical disc drive 30 may give instructions such that recording or reading of the data is performed only for the far-side optical recording layers 12.

Next, description will be given of examples of the optical recording disc 1, in which different variations of the thickness of each layers, etc. are examined. FIG. 6 shows a table containing Examples 1-6 according to the present invention and Comparative Examples 1-2 (i.e., Comp. Ex. 1-2) that are not included in the present invention, in which variations such as thickness of each of the layers, position of the groove for tracking, and the like are exemplified. As with Examples 1-6, if the thickness of the base film 11 and the cover layer 14 is in the range of 10-50 micrometers and the total thickness is not more than 300 micrometers, the disc portion 10 as a whole can provide flexibility. However, as with Comparative Examples 1-2, if the total thickness is greater than 300 micrometers, the disc portion 10 does not provide flexibility and it is difficult to rotate the optical recording disc at high speeds.

Examples 1-6 and Comparative Examples 1-2 are carried out under conditions that a laser beam having a wavelength of 405 nm is used as the recording/reading light, an objective lens having numerical aperture (NA) of 0.85 that is the largest numerical aperture among currently widely used objective lenses is used, and the laser beam is focused on the first optical recording layer 12 counting from the cover layer 14. The spot size of the laser beam at the surface of the optical recording disc 1 facing to the objective lens is shown in FIG. 6 for each of Examples 1-6 and Comparative Examples 1-2. The spot size of the laser beam is calculated for the surface of the cover layer 14 in the case where the laser beam is irradiated from the cover layer side, and for the surface of base film 11 in the case where the laser beam is irradiated from the base film side, respectively. The table in FIG. 6 shows that in Examples 1-6, if the recording/reading light is irradiated from the cover layer side, the spot size at the surface of the cover layer 14 is smaller than 70 micrometers, so that a scratch or dust not more than about 50 micrometers is only allowable. However, if the recording/reading light is irradiated from the base film side, a scratch or dust equal to or more than 100 micrometers is allowable. Accordingly, it is preferable that if a distance from the subject optical recording layer 12 to the outer surface of the base film 11 is greater than the distance from the optical recording layer 12 to the outer surface of the cover layer 14, recording or reading of the data is performed on the subject optical recording layer 12 by irradiating the subject optical recording layer 12 with light through the base film 11.

In order to provide the optical recording disc 1 with sufficient tolerance to a scratch and the like, it is necessary that the size of a scratch not less than 50 micrometers should be accepted. To this end, the spot size of the recording/reading light at the surface of the light-irradiation side should be not less than 70 micrometers. It is therefore preferable that the thickness of the optical recording disc is equal to or more than 100 micrometers (i.e., two times the thickness (50 micrometers) of the base film in Example 3). In terms of tolerance to a scratch, a thicker optical recording disc 1 is preferable, and more preferably, the thickness of the optical recording disc 1 is equal to or more than 150 micrometers, and further preferably equal to or more than 200 micrometers.

The above optical recording disc 1 according to this embodiment of the present invention has the total thickness not more than 300 micrometers and provides flexibility. Therefore, the optical recording disc 1 is less likely to be damaged due to resonance, and it can be rotated at higher speeds and thus data can be transferred at a higher data transfer rate as compared with the conventional non-flexible optical recording disc. Further, although the optical recording disc 1 according to this embodiment has the total thickness not more than 300 micrometers, more than ten optical recording layers 12 are provided. This can realize a high-capacity optical recording disc in a compact design.

Further, since the optical recording disc 1 supports the disc portion 10 at the middle of the thickness of the core 19 (i.e., at the midpoint between (equally distant from) surfaces 19C, 19D which are to be supported by the spindle 32), the positional relations between the optical recording disc 1 and respective components of the optical disc drive 30 such as the optical pickup 35 and the stabilizer 31 can be kept in a similar manner when the optical recording disc 1 is set on the optical disc drive 30 with the base film 11 facing down and when the optical recording disc 1 is set on the optical disc drive 30 with the cover layer 14 facing down. Therefore, even if the optical recording disc 1 is reversed to change the surface through which light is incident onto a subject optical recording layer 12, the optical disc drive 30 can record or read the data in a similar operation with respect to a subject optical recording layer 12 of the optical recording disc 1.

According to the above embodiment, the optical recording disc 1 has spiral-shaped grooves 21, 23, 24 formed on the base film 11, the cover layer 14, and the intermediate layer 13, respectively. This can facilitate tracking control.

As described above, according to the recording or reading method for the optical recording disc 1, recording or reading of data is performed on the optical recording layers 12 in such a manner that if the distance from a subject optical recording layer 12 to the outer surface of the base film 11 is smaller than the distance from the subject optical recording layer 12 to the outer surface of the cover layer 14, the subject optical recording layer 12 is irradiated with light incident onto the subject optical recording layer 12 through the cover layer 14, whereas if the distance from the subject optical recording layer 12 to the outer surface of the base film 11 is greater than the distance from the subject optical recording layer 12 to the outer surface of the cover layer 14, the subject optical recording layer 12 is irradiated with light incident onto the subject optical recording layer 12 through the base film 11. This can ensure a relatively large distance between the subject optical recording layer 12 on which recording or reading of the data can be performed and the surface of the disc portion 10 through which light is incident. Therefore, even if the surface of the disc portion 10 through which light is incident onto the subject optical recording layer 12 has a scratch or dust is adhered thereto, such a scratch or dust is less likely to significantly affect on the recording or reading performance.

Although the present invention has been described with reference to the above exemplary embodiment, the present invention is not limited to this specific embodiment and various changes or modifications may be made where necessary. For example, the groove for tracking may be formed on the inner surfaces of the base film 11 and the cover layer 14 as well as on the intermediate layer 13.

The invention claimed is:

1. An optical recording disc comprising:
   at least ten optical recording layers, each having a thickness in the range of 0.01-2 micrometers;
   a plurality of solid intermediate layers each interposed between adjacent optical recording layers;
   a base film configured to support the optical recording layers and the intermediate layers; and
   a cover layer disposed opposite to the base film with the optical recording layers and the intermediate layers interposed therebetween,
   wherein the optical recording disc is in the shape of a disc as a whole, and wherein the total thickness of the optical recording disc is not more than 300 micrometers, and the optical recording disc provides flexibility.

2. The optical recording disc according to claim 1, wherein the cover layer has a thickness in the range of 10-50 micrometers.

3. The optical recording disc according to claim 1, wherein a spiral-shaped groove used for tracking is formed on an inner surface of at least one of the cover layer and the base film.

4. The optical recording disc according to claim 1, wherein at least one of the intermediate layers has a spiral-shaped groove used for tracking.

5. A method for recording or reading data on an optical recording disc of claim 1, comprising the steps of:
   setting the optical recording disc in a recording apparatus or a reading apparatus; and
   recording or reading data on the optical recording layers in such a manner that if a distance from an optical recording layer to an outer surface of the base film is smaller than a distance from the optical recording layer to an outer surface of the cover layer, the optical recording layer is irradiated with light incident onto the optical recording layer through the cover layer, whereas if the distance from the optical recording layer to the outer surface of the base film is greater than the distance from the optical recording layer to the outer surface of the cover layer, the optical recording layer is irradiated with light incident onto the optical recording layer through the base film.

6. The method according to claim 5, further comprising reversing the optical recording disc.

7. The optical recording disc according to claim 1, wherein each of the intermediate layers has a thickness in the range of 3-20 micrometers.

8. The optical recording disc according to claim 1, wherein the base film has a thickness in the range of 10-100 micrometers.

9. The optical recording disc according to claim 1, further comprising a pair of spacer layers adjacent to the base film and the cover layer, and wherein each of the spacer layers has a thickness in the range of 1-20 micrometers.

10. The optical recording disc according to claim 9, wherein a spiral-shaped groove used for tracking is formed on both the cover layer and the base film.

11. The optical recording disc according to claim 1, wherein at least twenty optical recording layers are provided.

12. An optical recording disc comprising:
   at least ten optical recording layers, each having a thickness in the range of 0.01-2 micrometers;
   a plurality of solid intermediate layers each interposed between adjacent optical recording layers and having a thickness in the range of 3-20 micrometers;
   a base film configured to support the optical recording layers and the intermediate layers and having a thickness in the range of 10-100 micrometers; and
   a cover layer disposed opposite to the base film with the optical recording layers and the intermediate layers interposed therebetween and having a thickness in the range of 10-50 micrometers,
   wherein the optical recording disc is in the shape of a disc as a whole, and wherein the total thickness of the optical recording disc is not more than 300 micrometers, and the optical recording disc provides flexibility.

13. The optical recording disc according to claim 12, wherein a spiral-shaped groove used for tracking is formed on an inner surface of at least one of the cover layer and the base film.

14. The optical recording disc according to claim 12, wherein at least one of the intermediate layers has a spiral-shaped groove used for tracking.

15. The optical recording disc according to claim 12, further comprising a pair of spacer layers adjacent to the base film and the cover layer, and wherein each of the spacer layers has a thickness in the range of 1-20 micrometers.

16. The optical recording disc according to claim 12, wherein a spiral-shaped groove used for tracking is formed on both the cover layer and the base film.

17. The optical recording disc according to claim 12, wherein at least twenty optical recording layers are provided.

* * * * *